United States Patent [19]
Johnson

[11] Patent Number: 5,358,362
[45] Date of Patent: Oct. 25, 1994

[54] TAPPING ATTACHMENT FOR RADIAL TAPPING

[75] Inventor: Allan S. Johnson, Newport Beach, Calif.

[73] Assignee: Tapmatic Corporation, Id.

[21] Appl. No.: 41,776

[22] Filed: Apr. 2, 1993

[51] Int. Cl.⁵ .......................... B23G 3/02; B23G 5/14
[52] U.S. Cl. ...................................... 408/139; 192/21; 192/51; 470/181
[58] Field of Search .............. 408/139, 141; 409/215; 192/21, 44, 45, 51; 470/181, 182

[56] References Cited

U.S. PATENT DOCUMENTS

| | | | |
|---|---|---|---|
| 3,999,642 | 12/1976 | Johnson | 408/139 X |
| 4,014,421 | 3/1977 | Johnson | 408/139 X |
| 4,705,437 | 11/1987 | Johnson | 408/139 |
| 5,025,548 | 6/1991 | Justesen | 409/215 X |
| 5,209,616 | 5/1993 | Johnson | 408/139 |

Primary Examiner—Steven C. Bishop
Attorney, Agent, or Firm—Joseph R. Evanns

[57] ABSTRACT

A tapping attachment for use in connection with radial tapping comprises a tap spindle member rotatable in a tapping direction, a driven part engageable with a driving part from a power source in a different direction from the tapping direction, a forward drive member engageable with the tap spindle member to drive the tap spindle member in the tapping direction, a reverse drive member engageable with the tap spindle to drive it in a direction opposite to the tapping direction, means for transmitting drive to the forward drive member and the reverse drive member and engageable with the driven part for receiving drive and with the tap spindle member. The forward drive member and the reverse drive member are moveable axially along the tapping direction relative to the tap spindle member and upon relative axial movement in a direction opposite to the tapping direction, the forward drive member disengages from the tap spindle member and the reverse drive member engages in driving engagement with the tap spindle member to impart reverse rotation to the tap spindle member.

17 Claims, 4 Drawing Sheets

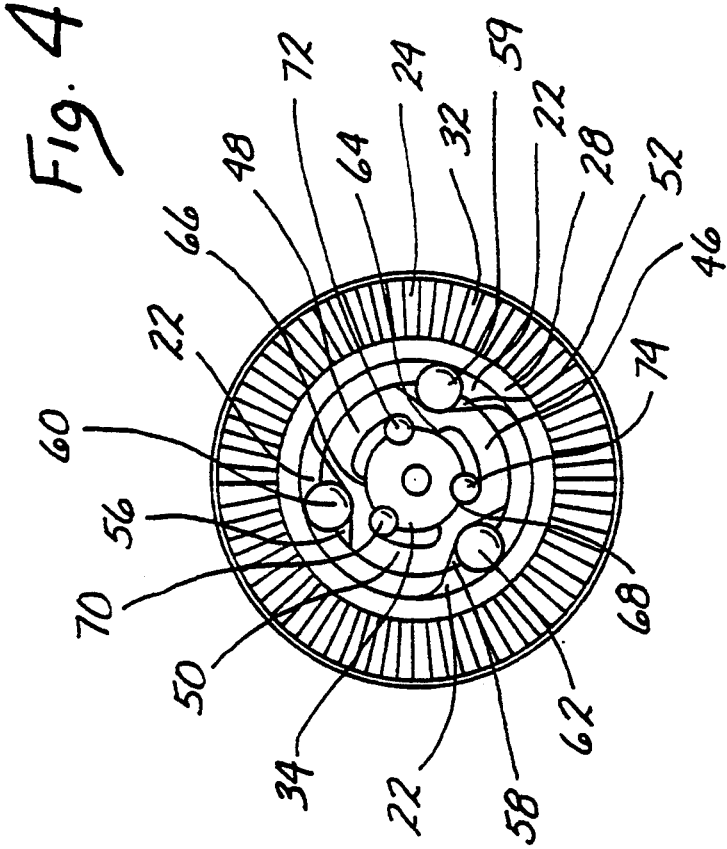

TAPPING ATTACHMENT FOR RADIAL TAPPING

BACKGROUND OF THE INVENTION

1. Field of the Invention

The field of the invention is that of tapping attachments for providing tapping in a radial direction, that is in a direction different from that of a driver member from a driving machine. In particular, the invention relates to radial tapping attachments which are self-reversing.

2. Description of the Prior Art

The field of the invention and prior art patents are exemplified in the field of self-reversing tapping attachments by reference to prior patents of the inventor of the invention of the instant application. These include U.S. Pat. Nos. 3,999,642, 4,014,421, 4,705,437, and 5,209,616, and patents cited therein, all of which are hereby incorporated by reference herein.

The aforesaid patents disclose and claim self-reversing tapping attachments including a tap-holding spindle together with simultaneously rotating forward and reverse drivers, the spindle being freely floating and moveable axially with respect to the forward and reverse drivers. Under the influence of the forward driver, the tap in effect screws itself into the hole being tapped in the workpiece. Upon cessation of feed by the tapping machine and retraction of the tapping machine, causing relative axial movement between the tap holding spindle and the driver members, the forward drive member becomes disengaged from the tap spindle. Upon further retractive movement by the tapping machine, additional relative movement occurs whereby the reverse drive member becomes engaged with the tapping spindle, causing reverse rotation of the tap spindle and unscrewing the tap from the hole. In this manner, self-reversing is accomplished.

With high-speed, computer numeric controlled (CNC) machining centers, the capability afforded by said U.S. Pat. No. 4,705,437 is particularly pertinent. Under the '437 patent, the gear arrangement is such that in particular embodiments forward and reverse drive members rotate at different rates of speed, to achieve the desirable result of reducing excessive wear.

Recently, further progress has been made in tapping through improvements in CNC lathes. As a consequence of this, utilization has increased of radial tapping. This is tapping which is accomplished by a tap cutting in a direction transverse to the direction of the driving part from the driving machine. Such radial tapping is utilized, for example, where space is at a premium, where the configuration of the workpiece and the working space are such that axial tapping is inconvenient or unfeasible, or where the workpiece is such that it is more effective to tap it radially than axially.

Existing radial tapping attachments require the driving machine to reverse itself in order to remove the tap from the workpiece upon completion of tapping. This has drawbacks in particular with respect to computer numeric control devices, creating delays and complications tending to diminish some of the advantages of tapping from automated driving machines. Such machines are most advantageously programmed to feed the driving part to the tapping attachment and then to withdraw, as opposed to reversing rotation.

Therefore, there has been a felt but unfulfilled need for a self-reversing tapping attachment for use in connection with radial tapping.

SUMMARY OF THE INVENTION

The present invention relates to a self-reversing tapping attachment for use in connection with radial tapping comprising: a tap spindle member rotatable in a tapping direction; a driven part engageable with a driving part from a power source in a different direction from the tapping direction; a forward drive member engageable with the tap spindle member to drive the latter in the tapping direction; a reverse drive member engageable with the tap spindle to drive it in a direction opposite to the tapping direction; means for transmitting drive to said forward drive member and said reverse drive member and engageable with the driven part for receiving drive therefrom, the forward drive member being moveable axially along the tapping direction relative to said tap spindle member, whereby forward drive is imparted to the tap spindle member for tapping and upon relative axial movement in a direction opposite to the tapping direction the forward drive member disengages from the tap spindle member and said reverse drive member engages in driving engagement with the tap spindle member to impart reverse rotation to the tap spindle member.

BRIEF DESCRIPTION OF THE DRAWINGS

FIG. 4 is a composite sectional view of the tapping attachment of FIG. 1 taken along the lines 4A—4A and 4B—4B.

DESCRIPTION OF THE PREFERRED EMBODIMENT

Figure 1:
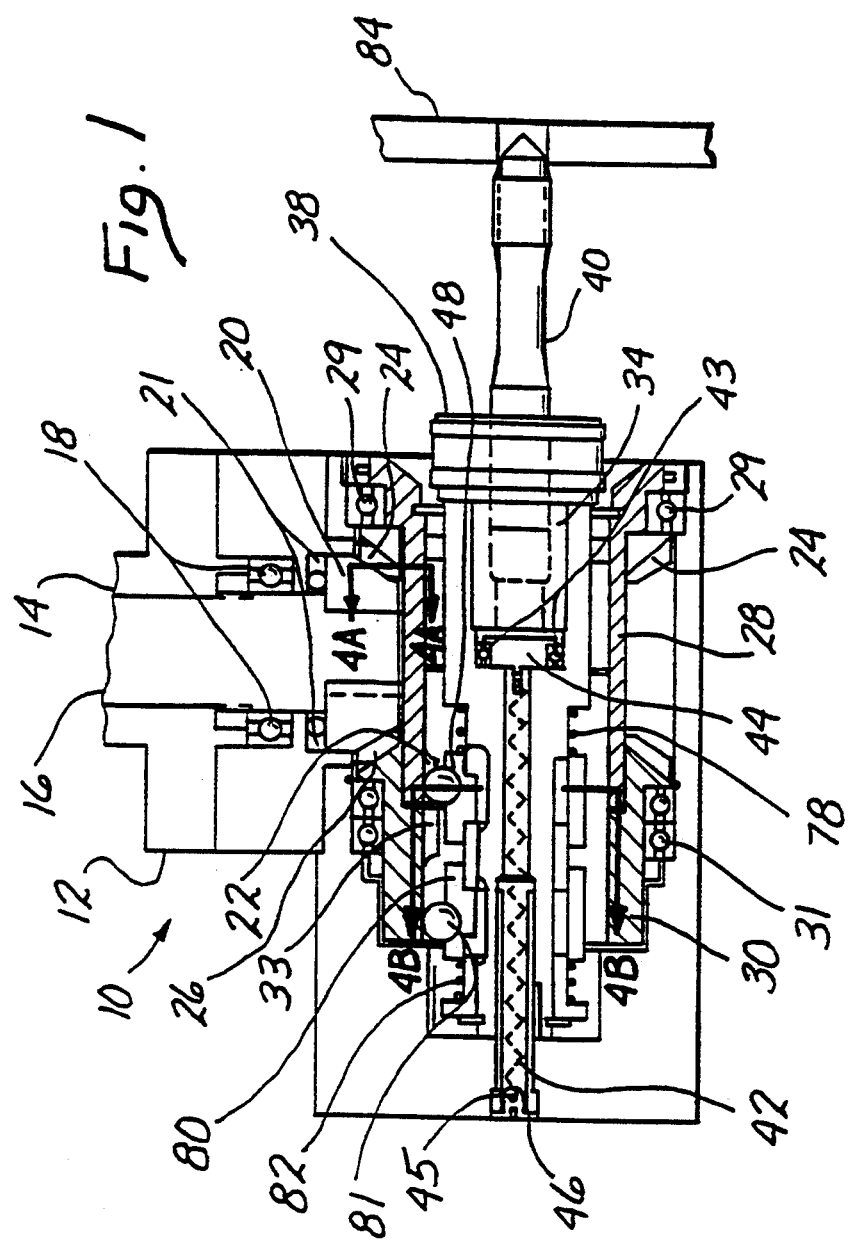
FIG. 1 is a side view of a tapping attachment in accordance with the invention, in a forward drive configuration mode.

As depicted in FIGS. 1–4, a tapping attachment 10 for radial tapping comprises a housing 12. Housing 12 defines an aperture 14 to accommodate a drive member in the form of a shank 16 connectable to a source of rotary power. The rotary power source in many applications will be a computer numeric controlled turret or other form of automatic tool.

Bearings 18 disposed in housing 12 accommodate the shank 16. Shank 16 engages with a pinion gear member 20 in housing 12 though splines 21.

Pinion gear member 20 engages a forward gear member 24 including a bevel portion and a reverse gear member 26 including a bevel portion. Forward gear 24 is disposed closer to a tap-holding end of a tapping spindle described hereinbelow and the reverse gear 26 is disposed further away from said tap-holding end. The pinion gear member 20 together with forward drive gear member 24 and reverse gear member 26 comprises drive transmitting means for the rotary drive provided by shank 16. In particular applications, forward gear 24 has more gear teeth than reverse gear 26, as for example, thirty-seven (37) and thirty five (35) teeth respectively, resulting in a difference in rotation velocities whereby the reverse drive velocity is less than the forward drive velocity. This serves the purpose of facilitating smooth operation by combating any tendency to shift back and forth between neutral and reverse as is fully described in U.S. Pat. No. 4,705,437 incorporated by reference herein. In other applications of the invention, the gear arrangement is such that the forward and reverse drive velocities are substantially equal.

Forward gear 24 is engageable in driving engagement with a forward drive member 28. Forward drive member 28 is generally configured in the form of a cylindrical sleeve positioned generally symmetrically about the longitudinal mid-line of housing 12. Forward drive member carries at least one forward drive spline 22. Bearings 29 journal forward drive member 28 in housing 12.

Reverse gear 26 is engageable in driving engagement with reverse drive member 30. Reverse drive member 30 is of a generally cylindrical configuration and, like forward drive member 28, defines a bore and is disposed symmetrically about the longitudinal mid-line of housing 12. Bearings 31 journal reverse drive member 30 in housing 12. Reverse drive member 30 includes at least one reverse drive spline 33.

As best seen in FIG. 4, driving engagement between forward gear 24 and forward drive member 28 is accomplished through gear teeth 32. In a similar manner, driving engagement between reverse gear 26 and reverse drive member 30 is accomplished through gear teeth (not shown).

Disposed within the central bores formed by forward drive member 28 and reverse drive member 30 is a tap-holding spindle member 34. Member 34 is mounted in housing 12 along the longitudinal mid-line thereof. Spindle member 34 includes a tap holder 38 which holds a tap 40 by frictional engagement.

Spindle member 34 is attached to a spring member 42 by means of a cap 44 which defines an eye (not shown) in which the spring is hookingly engaged. Bearings 43 journal cap 44. Spring 42 is fastened at its inner end at an eye 45 defined in a fitting 46 secured in housing 12. Spring 42 biases the tap spindle member 34 inwardly, i.e. in the reverse tapping direction toward engagement with the forward drive member 28.

A forward drive sleeve 48 is mounted upon spindle member 34. Forward drive sleeve 48 is described in full and complete detail in above-cited U.S. patent application Ser. No. 5,209,616, incorporated by reference herein. Thus, the description herein will be brief. Drive sleeve 48 comprises a generally annular member 50 defining a central bore to accommodate the tap spindle member 34. As best seen in FIG. 4, sleeve 48 includes slots 52, 56, 58 for accommodating drive balls 59, 60, 62. Forward drive sleeve 48 includes inner drive splines 64, 66, 68 disposed therein.

Spindle 34 includes drive pins 70, 72, 74. Drive pins 70, 72, 74 are engageable in driving engagement with inner drive splines 64, 66, 68. Drive balls 59, 60, 62 are engageable in driving engagement with drive splines 22 of member 28.

Spring member 78 biases forward drive sleeve 48 in the opposite direction to the tapping direction, inwardly in housing 12, so that in the at rest position, forward drive sleeve 48 is engaged in driving engagement with forward drive member 28.

A reverse drive sleeve member 80 is configured in similar manner as forward drive sleeve 48. Rear drive sleeve 80 is disposed upon tap spindle member 34 radially inwardly of the tap holder 40 within housing 12 and contains at least one drive ball 81. A spring member 82 biases rear drive sleeve 80 in the direction of forward drive sleeve 48.

In operation, a tapping attachment for radial tapping in accordance with the invention receives power from rotating drive member 16 through driven part pinion 20. Rotation is imparted to forward drive member 28 and reverse drive member 30 through gears 24, 26 causing members 28, 30 to engage in substantially simultaneous rotation. Rotation is imparted from forward drive member 28 to forward drive sleeve 48, which as noted above, is normally engaged with drive member 28 in the at rest position due to biasing spring 42. In turn, forward drive sleeve 48 imparts drive to tap spindle member 34 so that tap 40 rotates forwardly into workpiece 84. The tapping direction is transverse to the direction of driving part 16. In this case, the angle between drive member 16 and the tapping direction is substantially equal to 90°. In accordance with the invention, other angles between these two directions may be employed in particular applications.

Figure 2:
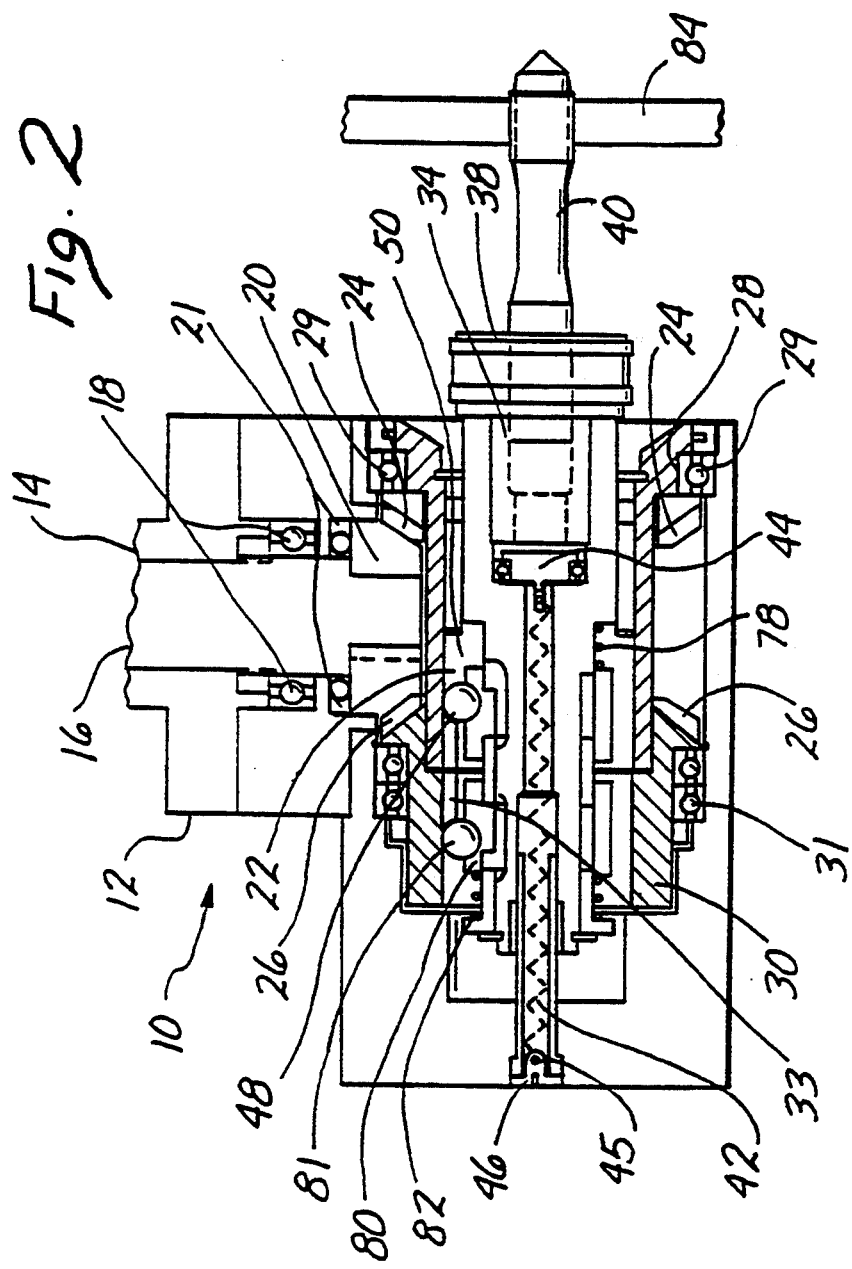
FIG. 2 depicts the tapping attachment of FIG. 1 in a neutral configuration.
Figure 3:
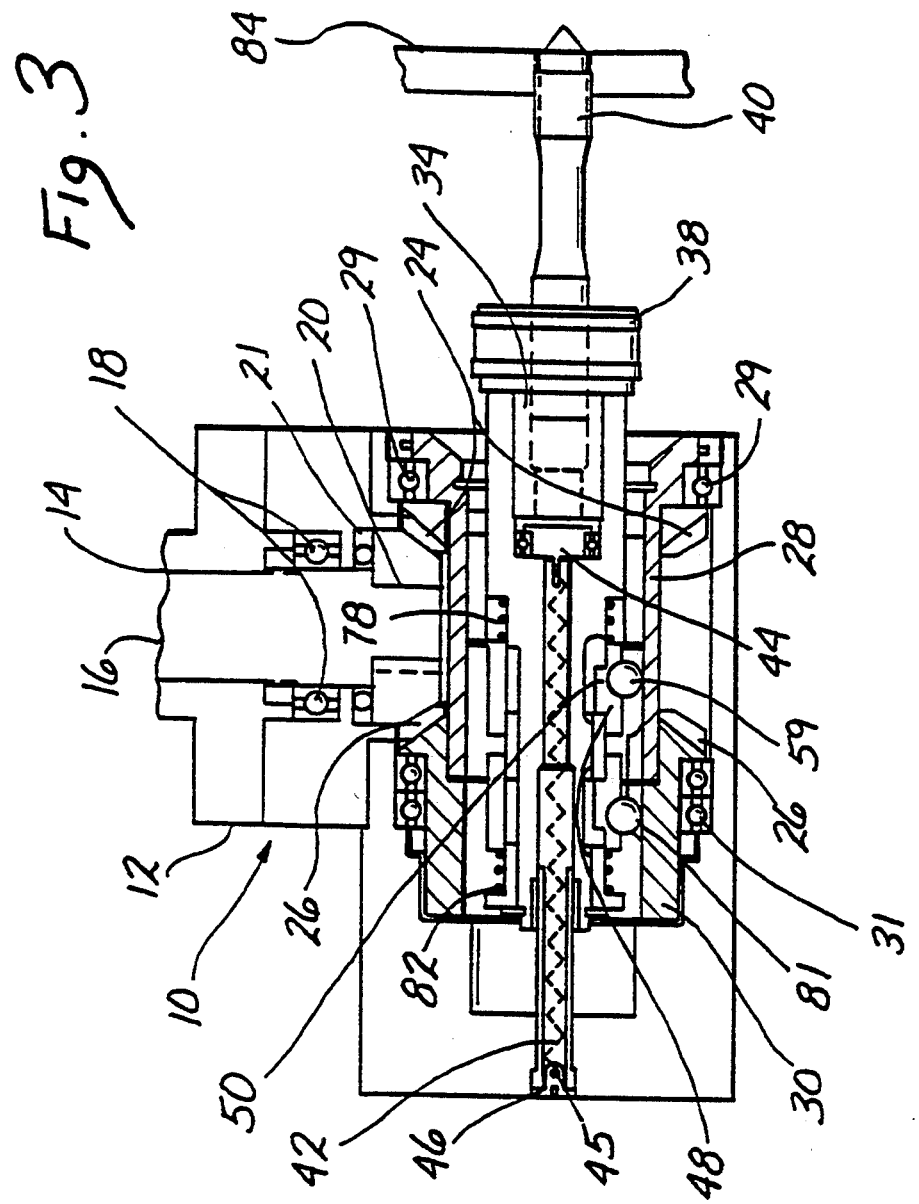
FIG. 3 depicts the tapping attachment of FIG. 1 in a reverse drive configuration.

Upon cessation of feed from the power source, the machine will cause retraction of the tapping attachment away from the workpiece 84. At this point, the tap 40 is fastened in the workpiece having screwed itself thereinto. Consequently, the housing 12 will be pulled in an axial direction opposite to the tapping direction, causing relative movement along the tapping direction between spindle member 34, carrying drive sleeve 48, and forward drive member 28. This causes disengagement of forward drive sleeve 48 from the forward drive member 28; forward rotation of the tap 40 ceases and a neutral position is reached, as best seen in FIG. 2. Further retraction of housing 12 causes further relative axial movement of the tap spindle member 34, carrying reverse drive sleeve 80, with respect to reverse drive member 30 until reverse drive member 30 and reverse drive sleeve member 80 engage in driving engagement, as best seen in FIG. 3. At this point, tap spindle 34 commences rotation in the reverse tapping direction, causing reverse rotation of the tap 40 such that the tap 40 unscrews itself from the hole in the workpiece 84. When the tap 40 is free from the hole, spring 78 draws tap spindle member 34 to the rest position in which the forward drive member 28 is engaged with forward drive sleeve member 48.

In the foregoing manner, self-reversing tapping attachments capable of radial tapping are provided.

The foregoing is illustrative of the invention, which is defined only by the appended claims interpreted in light of the specification and drawings.

What is claimed is:

1. A self-reversing tapping attachment for radial tapping comprising:
    (a) a tap spindle member for holding a tap and rotatable to tap in a tapping direction;
    (b) a forward drive member engageable with said tap spindle member to drive said tap spindle member in said tapping direction;
    (c) a reverse drive member engageable with said tap spindle member for driving said tap spindle member in a direction opposite to said tapping direction;
    (d) drive transmitting means for transmitting drive to said forward drive member and said reverse drive member and engageable with said driving part for receiving drive therefrom, said tap spindle member being moveable axially along said tapping direction relative to said forward drive member and said reverse drive member, whereby forward drive is imparted to said tap spindle member for tapping and upon movement of the forward drive member relative to said tap spindle member in a direction opposite to said tapping direction, said forward drive member disengagable from said spindle member and said reverse member engages in driving engagement with said tap spindle member to impart reverse rotation thereto.

2. The invention as set forth in claim 1 wherein said forward drive member is positioned closer to the tap holder on said tap spindle member than is said reverse drive member.

3. The invention as set forth in claim 1 further including means for biasing said tap spindle member into driving engagement with said forward drive member.

4. The invention as set forth in claim 1 wherein said drive transmitting means produces substantially simultaneous rotation of said forward drive member and said reverse drive member at different speeds.

5. The invention as set forth in claim 4 wherein said forward drive member rotates at a greater speed than the speed of said reverse drive member.

6. The invention as set forth in claim 5, wherein said drive transmitting means comprises a pinion gear member, a first bevel gear member engageable with said forward drive member and a second bevel gear member engageable with said reverse drive member, said pinion gear member being engageable in driving engagement with said bevel gear members and said bevel drive members having gear teeth, said first bevel gear member having a larger quantity of teeth than said second bevel gear member.

7. The invention as set forth in claim 1 wherein the direction of rotation of said driving part from said power source is substantially perpendicular to said tapping direction.

8. The invention as set forth in claim 6 further including a housing, said pinion gear being mounted within said housing, said housing defining an orifice for insertion thereinto of said driving part.

9. The invention as set forth in claim 4 wherein said forward drive member and said reverse drive member rotate at substantially equal speeds.

10. A self-reversing tapping attachment for radial tapping comprising:
 (a) a driven part engageable with a driving part directed in a first direction from a power source;
 (b) gear means engageable with said driven part for transmitting rotary drive from said driven part to a forward drive member and a reverse drive member;
 (c) a forward drive member engageable in driving engagement with said gear means;
 (d) a reverse drive member engageable in driving engagement with said gear means;
 (e) a tap spindle member including a tap holder for holding a tap, said tap spindle member being rotatable in a tapping direction different from said first direction, said tap spindle member being engageable with said forward drive member for forward rotation to produce tapping in said tapping direction, said reverse drive member being engageable with said tap spindle member for producing reverse rotation of said tap spindle member, said tap spindle member being moveable in said tapping direction and in a reverse tapping direction opposite to said tapping direction relative to said forward drive member and said reverse drive member such that said tap spindle member is disengageable from said forward drive member upon relative movement of said forward drive member in said reverse tapping direction.

11. The invention as set forth in claim 10 wherein said tap spindle member is engageable with said reverse drive member to rotate said tap spindle in the reverse tapping direction upon relative movement between said tap spindle member and said reverse drive member in the reverse tapping direction.

12. The invention as set forth in claim 11 wherein said forward drive member is disposed forwardly in said tapping direction from said reverse drive member.

13. The invention as set forth in claim 11 wherein said tap spindle member and said forward drive member are biased to engage one another in driving engagement.

14. The invention as set forth in claim 11 wherein said gear means is engageable with said reverse drive member and said forward drive member to impart rotation thereto substantially concurrently.

15. The invention as set forth in claim 11 wherein said gear means is engageable with said forward drive member and said reverse drive member to drive said forward drive member at a greater velocity than said reverse drive member.

16. The invention as set forth in claim 11 further including a first drive sleeve and a second drive sleeve mounted upon said tap spindle member, said first drive sleeve member being positioned closer to said tap holder than said second drive sleeve member, said first drive sleeve being engageable with said forward drive member to provide forward rotation in said tapping direction for said tap spindle member and being moveable axially with respect to said forward drive member to be disengageable therefrom upon movement in a reverse tapping direction, and said second drive sleeve being axially moveable in a reverse tapping direction with respect to said reverse drive member to be engageable therewith to impart reverse rotation to said tap spindle member.

17. The invention as set forth in claim 11 wherein said gear means is engageable with said forward drive member and said reverse drive member to drive said forward drive member and said reverse drive member at substantially equal velocities.

* * * * *